(12) United States Patent
Son

(10) Patent No.: US 8,496,144 B2
(45) Date of Patent: Jul. 30, 2013

(54) REMOVABLE STEERING WHEEL HOLDER FOR AN ELECTRONIC DEVICE

(75) Inventor: Jae S. Son, Rancho Palos Verdes, CA (US)

(73) Assignee: GO Smart Inc., Los Angeles, CA (US)

( * ) Notice: Subject to any disclaimer, the term of this patent is extended or adjusted under 35 U.S.C. 154(b) by 418 days.

(21) Appl. No.: 12/897,904

(22) Filed: Oct. 5, 2010

(65) Prior Publication Data

US 2012/0080465 A1   Apr. 5, 2012

(51) Int. Cl.
*B60R 11/02* (2006.01)
*B60R 7/00* (2006.01)

(52) U.S. Cl.
USPC ............................. 224/276; 224/552; 224/929

(58) Field of Classification Search
USPC ................. 224/276, 420, 450, 483, 552, 570, 224/553, 929; 24/115 A, 129 D, 129 R, 129 W, 24/196, 256 WS, 570; 108/44
See application file for complete search history.

(56) References Cited

U.S. PATENT DOCUMENTS

| | | | |
|---|---|---|---|
| 2,150,709 A | 3/1939 | Bake | |
| 2,514,102 A | 7/1950 | Strumbos | |
| 5,056,822 A | 10/1991 | Shim | |
| 5,385,283 A | 1/1995 | Shioda | |
| 5,542,314 A | 8/1996 | Sullivan | |
| 6,082,535 A * | 7/2000 | Mitchell | 206/320 |
| 6,206,258 B1 * | 3/2001 | Calder | 224/420 |
| 6,209,767 B1 * | 4/2001 | Liou | 224/276 |
| 6,305,217 B1 * | 10/2001 | Mansfeld et al. | 73/114.61 |
| 6,665,524 B1 * | 12/2003 | Niemann | 455/575.6 |
| 7,594,631 B1 * | 9/2009 | Carnevali | 248/219.4 |
| 2003/0106919 A1 * | 6/2003 | Chuang | 224/420 |
| 2005/0045681 A1 * | 3/2005 | Hancock et al. | 224/401 |
| 2007/0029359 A1 | 2/2007 | Smith | |
| 2007/0262223 A1 * | 11/2007 | Wang et al. | 248/346.07 |
| 2008/0104803 A1 * | 5/2008 | Tsay et al. | 24/306 |
| 2010/0264182 A1 * | 10/2010 | Perlman et al. | 224/409 |
| 2011/0121148 A1 * | 5/2011 | Pernia | 248/207 |

* cited by examiner

*Primary Examiner* — Nathan J Newhouse
*Assistant Examiner* — Todd Anderson
(74) *Attorney, Agent, or Firm* — Boris Leschinsky

(57) ABSTRACT

A removable holder for a smart phone is provided to support the smart phone in front of a driver on a steering wheel. Close proximity of the smart phone allows easy access and good visibility of its display which helps in using the GPS navigation or other features of a smart phone while the vehicle is in motion. Retention of the smart phone assures its steady position when the steering wheel is turned but at the same time allows for its deflection out of the way in case of an airbag deployment. The attachment element of the holder includes two raised bars and an elastic band to form a 3-point contact area with the steering wheel. The smart phone retainer is length-adjustable to accommodate a variety of smart phones. The holder can be easily mounted and removed from the steering wheel without using hand tools.

10 Claims, 9 Drawing Sheets

REMOVABLE STEERING WHEEL HOLDER FOR AN ELECTRONIC DEVICE

BACKGROUND OF THE INVENTION

The present invention relates generally to supporting devices such as holders or clips to support an object such as a smart phone on a steering wheel of an automobile. More particularly, the holder of the invention relates to devices that can be easily placed on and removed from a steering wheel of an automobile without the need to use any tools. At the same time, the holder of the invention assures safety of the driver by allowing the smart phone to swing away in case of airbag deployment in the rare case where there is sufficient interference while typically the airbag deploys in front of the holder.

Certain objects, such as cell phones, smart phones for example an iPhone, portable GPS navigation devices, notepads and maps, are commonly used within a vehicle, whether during longer trips or on a day-to-day basis. For the purposes of this description all these objects are collectively described using a term "smart phone". The term vehicle is used to include automobiles, trucks, buses, watercrafts, airplanes, bicycles, motorcycles, snowmobiles and other moving objects controlled by an operator using a steering implement. The term "steering wheel" is used to include that of a vehicle or a bicycle and encompasses such items as handle bars or other bars located in front or nearby the operator of a vehicle.

The layout of many vehicles, however, and in particular automobiles, is rarely convenient to the use of such devices. Typically, vehicle interiors lack any space in which the smart phone may be placed for easy access. Moreover, the use of smart phones is often hindered, since the operator must often simultaneously operate the vehicle. In modern large vehicles, such as SUVs and vans, the windshield is located quite far from the driver and so any window-mounting holders for smart phones are not convenient in operation as they require a far reach for the driver to operate the device.

GPS Navigation devices that map the driver's location while driving have become a very useful tool for travelers. Many high-end automobiles have a built-in GPS navigation system that has a relatively large display built into the dashboard. While this feature is useful, the GPS becomes an essential necessity when traveling through an unfamiliar location as evidenced by rental car companies renting GPS navigation devices.

An alternative to renting a GPS device for owners of a smart phone such as an iPhone is to access Google Maps with GPS Navigation, but using such mobile device is problematic since there is not a convenient way to hold the device especially when driving.

Typical holders for small electronic devices are either permanently mounted inside the car using a goose neck mechanism or attached to the windshield with a suction cup. A typical location of such device is quite far away from the driver thus making it difficult to see the details of the screen and requires more attention looking away from the road. While this may be OK to make a phone call, using the navigation function is not as practical since the driver needs to look at the details of the map on the screen and the road frequently. To compensate for this problem, the typical display size in dedicated navigation devices is much larger than a screen of a cell phone.

Accordingly, smart phones may be more easily used as navigation devices when they are supported within or on a vehicle closer to the driver. Certain objects have been supported on a steering wheel of a vehicle for improved access. For example, various map and notepad holders for attachment to a steering wheel are found in U.S. Pat. Nos. 5,056,822 and 5,193,777. Clipboard attachments for a steering wheel are found in U.S. Pat. Nos. 2,150,709 and 5,385,283. Even cigarette cases and computers have been attached to vehicle steering wheels as disclosed in U.S. Pat. Nos. 2,514,102 and 5,542,314, respectively. These holder devices typically involve at least one bar crossing the steering wheel and attached thereto at two opposite locations. The presence of an object securely connected to the steering wheel and located across the middle thereof creates an obvious risk of interference with the airbag in case of an accident. Not only the device may prevent proper deployment of an airbag but also it creates a risk of injuring the driver by dislodging from the steering wheel and moving towards the driver when propelled by an airbag.

Various other deficiencies exist with current holder devices found in the art. For instance, many devices are difficult to install and use, and are commonly made to support one particular object, such as a notepad or a cigarette case. Moreover, no steering wheel support devices of the art allow for the simultaneous and continuous use of an object when the steering wheel is manipulated, such as when the vehicle is in motion. In particular, no device discloses supporting a smart phone on a vehicle's steering wheel, wherein the smart phone may be easily and continuously used by the occupant when operating the vehicle. Accordingly, these and other deficiencies may be addressed by the present invention.

SUMMARY OF THE INVENTION

Accordingly, it is an object of the present invention to overcome these and other drawbacks of the prior art by providing a novel steering wheel holder for a smart phone such as an iPhone or other electronic devices.

It is another object of the present invention to provide a novel steering wheel holder for a smart phone that can be quickly installed and removed from the steering wheel without the need for any tools.

It is another object of the present invention to provide an adjustment mechanism to work with many different sizes of smart phones.

It is another object of the present invention to provide a steering wheel holder for a smart phone having a small size which can be easily removed from a steering wheel and taken for travel.

It is a further object of the present invention to provide a steering wheel holder for a smart phone that would not interfere with the deployment of an airbag expanding from the central portion of such steering wheel.

It is yet a further object of the present invention to provide an adapter for the steering wheel holder for an object, the adapter configured to attach the object to a rearview mirror of the vehicle.

The steering wheel holder of the invention is based on an adjustable clamp capable of retaining a smart phone on the steering wheel. The clamp is equipped with a 3-point steering wheel attachment element to secure the holder to hang off a steering wheel in one location, typically at 12 o'clock position. As this forms a cantilever style attachment to the steering wheel, the attachment element is designed to support the smart phone on the steering wheel with sufficient force to maintain its steady position. This allows using the smart phone while the vehicle is moving and the steering wheel is turning. At the same time, the force with which the smart phone is retained about the steering wheel is deliberately designed to be less than the force exerted on the smart phone by a deploying airbag. Therefore, during an airbag deployment, if there is interference, the smart phone is rotated away while remaining attached to the steering wheel, which assures both a proper deployment of the airbag and safety of the driver.

While the most obvious application of the device is for an automobile, the device can be used on a bicycle, motorized two wheel devices mounted such that the smart phone is positioned on top of the handlebars. For extreme condition such as off-road use where there are lots of vibrations and shocks, a rubber band around the smart phone and the invention prevents it from sliding out sideways.

Another use for the invention is on watercrafts where the GPS functions can provide navigation aid when close to shore. The device can be mounted on the steering wheel or any number of numerous bars typically on a sail or motor boat. An additional clear elastic booty that snuggly covers and insulates the smart phone and the holder can provide protection from water splash and also provide additional security in retaining the smart phone by the holder.

BRIEF DESCRIPTION OF THE DRAWINGS

Subject matter is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION OF THE PREFERRED EMBODIMENTS OF THE INVENTION

Figure 1:
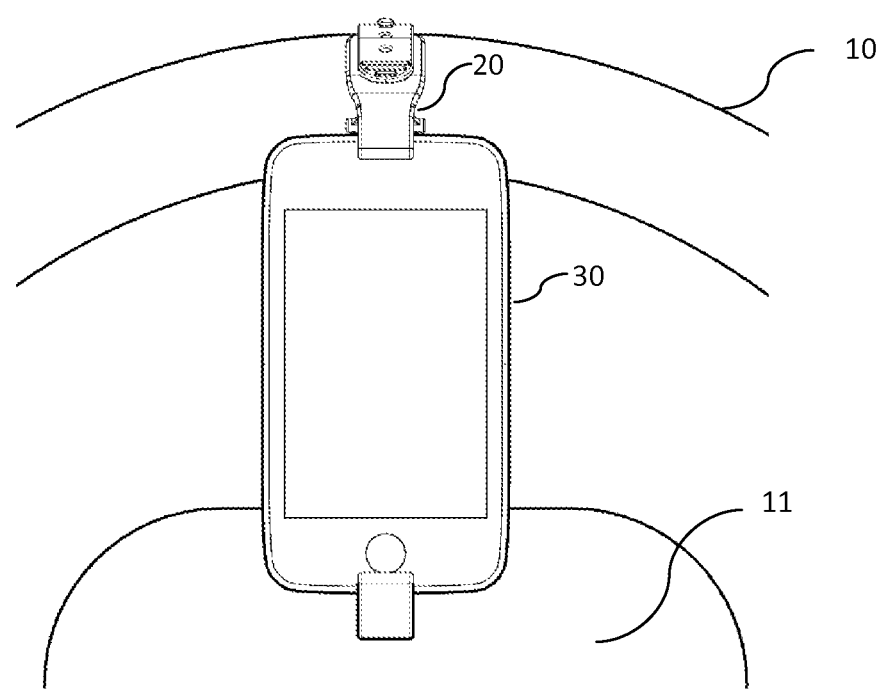
FIG. 1 is a general front view of the holder of the invention showing it in combination with the steering wheel and a smart phone.

The following description sets forth various examples along with specific details to provide a thorough understanding of claimed subject matter. It will be understood by those skilled in the art that claimed subject matter may be practiced without one or more of the specific details disclosed herein. Further, in some circumstances, well-known methods, procedures, systems, components and/or circuits have not been described in detail in order to avoid unnecessarily obscuring claimed subject matter. In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

The present invention allows various size smart phones and personal mobile devices to be securely mounted at one location on a steering wheel to allow their close proximity to the driver so that the details of the GPS or other displayed information can be better seen. The invention eliminates the need for the driver to hold the smart phone with their hand while driving. The smart phone is also positioned close to the field of view of the road thus reducing the amount of time the driver has to look away from the road to operate the smart phone.

Navigation applications on smart phones equipped with Internet access include for example Google Maps allowing not only the basic navigation function but also providing internet-based traffic condition updates and alternate routing which is typically not available on built-in GPS navigation devices or require an additional subscription fee plan.

The holder of the invention is compact making it convenient to take with the traveler. It may be easily removed by hand so that it may be used only when needed and doesn't diminish the appearance of the car as opposed the suction cup mechanisms that are typically semi-permanently mounted on the windshield or goose neck devices that are permanently mounted inside the car.

The general design of the holder 20 is illustrated in FIG. 1 and shows the holder itself with a smart phone 30 retained therein. The holder 20 may be attached to a steering wheel 10 at a single location, typically at 12 o'clock position, but people can move it off to one side for better visibility of the instrument panel or even place it at 6 o'clock position if the steering wheel design allows it. It is anticipated that the smart phone 30 when placed on the steering wheel will partially overlap and rest on the central portion 11 of the steering wheel 10, which contains an airbag. Typically, the airbag deploys from the center of the steering wheel and then expands so the holder 20 is behind the airbag after deployment. However, the design of the holder 20 allows the smart phone 30 to swing away but not separate from the steering wheel 10 in case of airbag deployment does interfere with the holder, in situations where the steering wheel is small and the smart phone is very large, as explained in more detail below.

Figure 2:
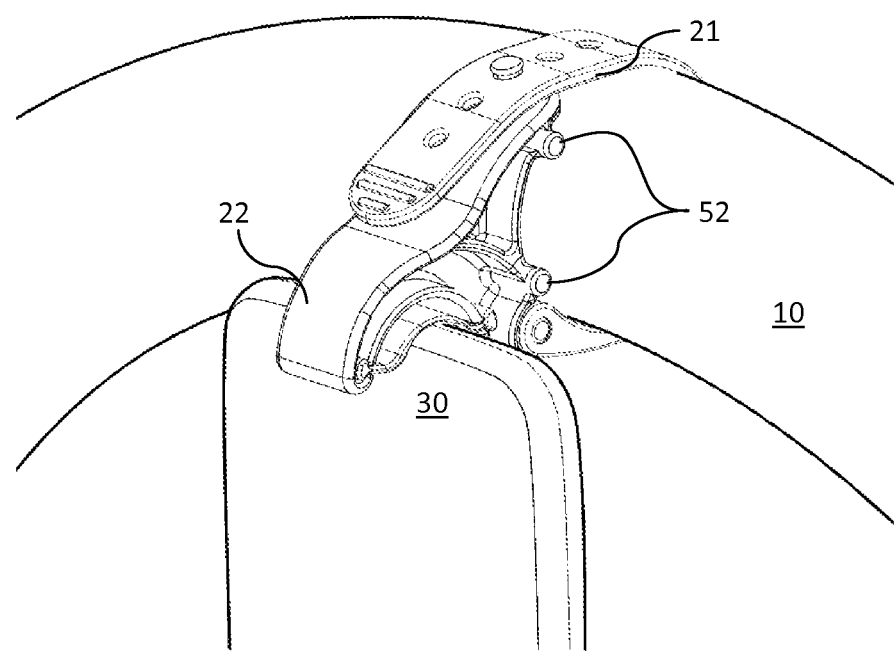
FIG. 2 is a perspective side view of the upper portion of the holder showing the details of attachment to the steering wheel.
Figure 3:
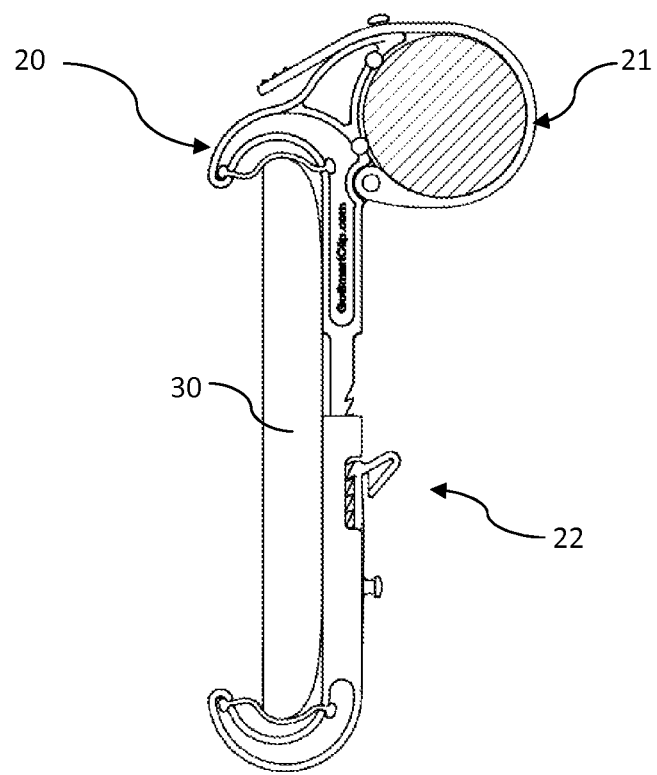
FIG. 3 is side view of the holder of the invention.
Figure 4:
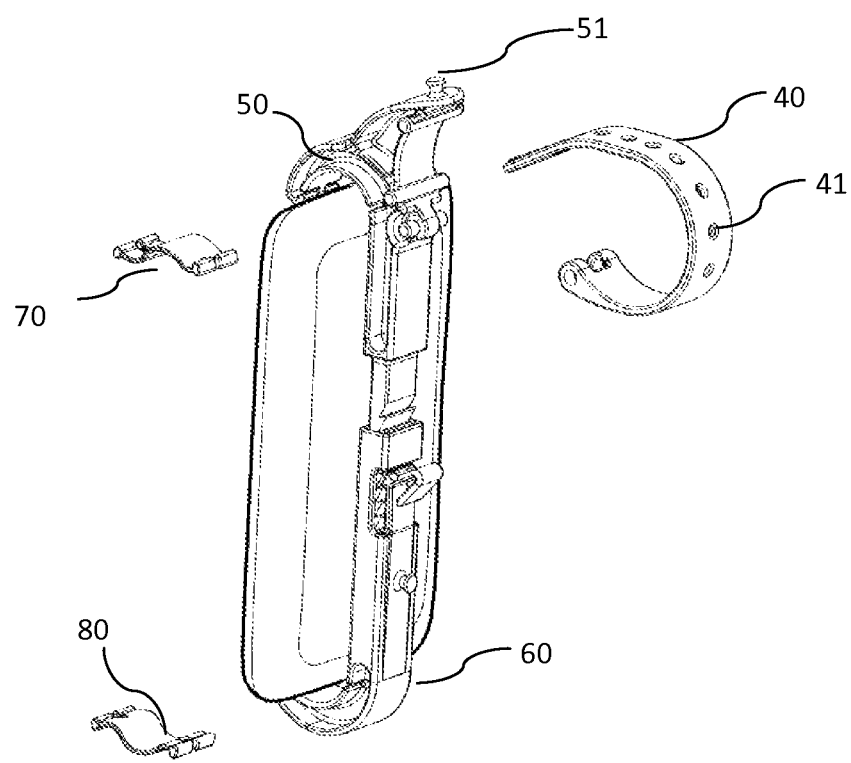
FIG. 4 is a perspective exploded rear view of the holder showing various components thereof.

FIGS. 2-4 show details of the holder 20. It comprises a smart phone retainer 22 and a steering wheel attachment 21. The smart phone retainer 22 generally comprises an upper clamp portion 50 and a lower clamp portion 60.

In order for the present invention to securely hold the smart phone 30, sufficient torque and friction is required between the holder and the steering wheel 10. The attachment element 21 includes an elastic band 40 that wraps around the steering wheel 10. Its elasticity is selected to provide sufficient force to prevent free rotation of the holder 20 since it is cantilevered off the steering wheel 10 when in a non-vertical orientation, such as when the driver is making a turn. Since the weight of a typical smart phone is approximately 200 g, a rotational holding torque of at least about 0.4-0.5 Nm may be sufficient to hold the smart phone 30 steady at any angle on the steering wheel 10. On the other hand, this level of torque is selected to be low enough that, in the event of an airbag deployment with a large smart phone located in front of a location of airbag deployment, the holder 20 will rotate about the steering wheel 10 and move the smart phone 30 out of the way. Importantly, the smart phone 30 will still be attached to the steering wheel 10 so as not to pose a danger to the driver during an accident.

As one of the objectives of the present invention is to provide a holder that is compact and configured for easy travel, the width of the holder 20 is minimized. In one embodiment, the width of the holder 20 is between 10-20 mm. Having a narrow width helps with portability. It also resolves a curvature issue associated with previous wider holder designs. Wide holders encounter a fit problem with the curved steering wheel. Incorporating one or another particular curvature into a holder makes it difficult to use with steering wheels having other curvatures. A narrow holder of the present invention can easily fit onto a variety of steering wheels without compromising its fit and the strength of its attachment.

Another aspect of the holder design is its universal ability to be securely attached to steering wheels of various cross-sectional diameters. To achieve this objective, the upper clamp portion 50 of the holder of the invention (FIGS. 2-4) incorporates two parallel round raised bars 52a and 52b to serve as points or lines of contact with the steering wheel 10. In one embodiment, the raised bars are about 20 mm long and about 3.5 mm in diameter. One bar 52a is separated from the other bar 52b along the cross-sectional curvature of the steering wheel 10. The size of the bars 52 and the distance separating the bars apart are selected to accommodate a variety of steering wheels such that when the holder 20 is secured onto the steering wheel 10, only the bars 52a and 52b are in contact with the wheel 10 along with the elastic band 40 and not other parts of the holder 20. This constitutes a 3-point line contact feature of the holder. In embodiments, the external surface of the two bars may be optionally overlaid (by over molding for example) with an elastic material to further enhance the friction between the holder 20 of the intention and the steering wheel 10.

The 3-point contact feature provides two functional advantages to the holder 20 of the invention. First, the contact to the steering wheel 10 is confined to these two bars and a band on the opposite side regardless of variable cross-sectional diameters of different steering wheels to allow for a more stable attachment. The elastic band 40 wrapped around the backside of the steering wheel 10 provides a constant tension force which is concentrated on the two connection areas defined by the raised bars 52, which further increases the friction. In order to tilt the holder away from its position, the raised bars 52 have to come off their contact with the steering wheel causing additional tension on the elastic band 40. Applying initial tension using the elastic band 40 during installation of the holder assures its steady position as the additional tension required to tilt the holder may be selected to be higher than the weight of the smart phone 30.

The second functional advantage of the 3-point contact feature is the improved stability of the holder of the invention to retain the smart phone steady when the steering wheel 10 is rotated and the phone is cantilevered horizontally. The two bars may be designed to slightly extend sideways beyond the width of the main part of the holder 20. This extension does not compromise the portability of the design but allows widening the area of contact between the steering wheel 10 and the holder 20. Because the two bars 52 straddle the diameter of the steering wheel 10, it effectively holds the smart phone in that position better than a continuous contact surface of the same size.

The feature of the invention which is important from a safety perspective is the length-adjustable smart phone retainer 22 which prevents the separation of the smart phone 30 from the retainer 22 in an accident once it is properly adjusted to fit the size of the smart phone. The upper clamp portion 50 includes an upper J-hook and the lower clamp portion 60 includes a lower J-hook together configured to retain the smart phone therebetween. At least one or preferably two elastic bumpers 70 and 80 are placed inside the J-hooks of the holder 20 to provide a constant compressive force to securely hold the smart phone 30 with up to 6 Newtons of force. Elastic bumpers 70 and 80 may be made from silicone rubber to provide high friction (friction coefficient of about 0.8 or more) in addition to the compressive force. High friction reduces a likelihood of accidental sideways slippage of the smart phone thus improving its stability on the steering wheel 10.

A length-adjustable releasable ratchet mechanism may be added to the retainer 22 between the upper 50 and lower 60 clamp portions as seen in FIG. 4 to allow the holder to be used with a broad range of smart phones. In embodiments, the ratchet mechanism allows using the holder of the invention with smart phones that are 100 mm to 135 mm in length, which encompasses all of the smart phones made to date. The internal width of the inside portion of the J-shaped hook is made sufficient (for example about 20 mm) to accommodate smart phones with or without a protective skin or cover.

The upper clamp portion 50 is combined with the steering wheel attachment 21, which includes a flexible elastic band 40 configured to be wrapped about the steering wheel 10 of a vehicle. To allow using the holder with a variety of steering wheels, the band 40 includes a number of holes 41 sized to be placed over the protruding pin 51 of the upper clamp portion 50. The band 40 is rotatably attached to the upper clamp portion 50 along axes 42 designed to allow it to be assembled and rotatably retained on one end at the upper clamp portion 50. When the holder is removed from the steering wheel, the elastic band can be stored along the main body of the holder.

Figure 5:
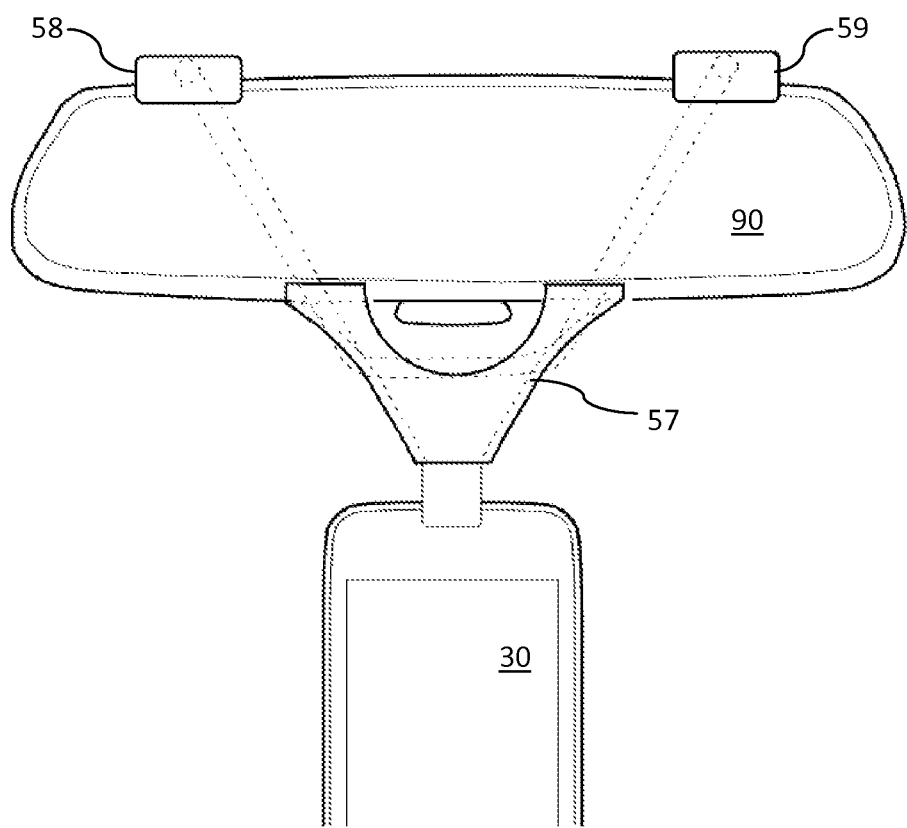
FIG. 5 is a front view of the holder with an adaptor to support the object on a rear view mirror of a vehicle.
Figure 6:
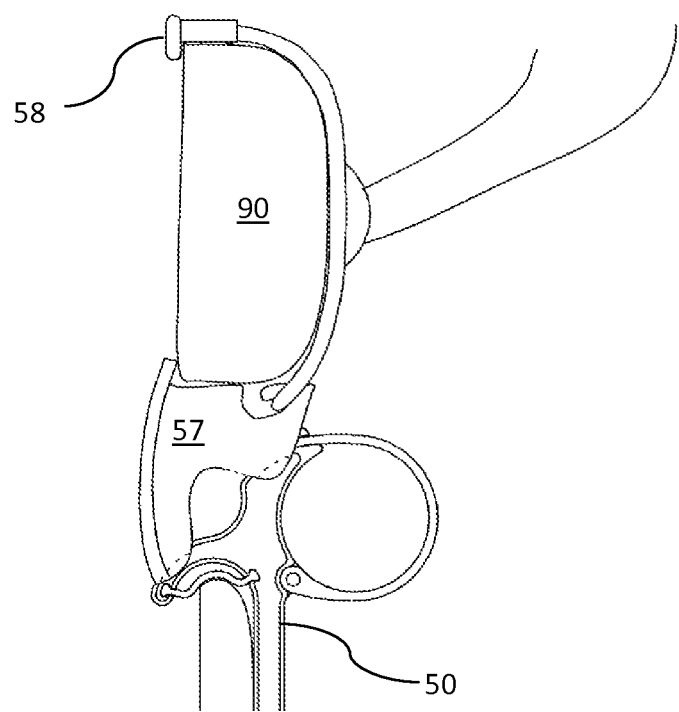
FIG. 6 is a side view of the same as shown in FIG. 5.

FIGS. 5 and 6 show additional improvements of the holder 20. In particular, another useful location for supporting a smart phone in the car is a rear view mirror. Adaptor 57 is designed to allow using the holder 20 to position the smart phone to hang off the rear mirror 90 by clamping onto the mirror using a three-point clamp (57, 58, 59) wrapped behind the mirror. Using the detachable adaptor 57 allows utilizing the smart phone-retaining components of the holder but now with an alternative vehicle mounting point.

Several additional improvements are now described in more detail. Visibility of the instrument panel is generally not a significant issue since the smart phone 30 is located in between the tachometer and the speedometer for most devices. Even when there is one central gauge in the middle of the instrument panel, the gauge needle and most of the driving speed range are easily seen without looking around the smart phone 30. The portrait orientation of the smart phone 30 further assists with improved visibility. Furthermore, many new cars such as the Toyota Prius has the instrument cluster in the center of the car up on the dash closer to the window. The first improvement addresses a potential issue of visibility of the instrument panel behind the smart phone when it is mounted on a steering wheel.

Many electronic devices such as smart phones have built-in rear facing cameras. When the device is mounted on a steering wheel, the camera typically faces the instrument panel. The improvement according to the present invention is a software program allowing viewing the camera field of view on the phone itself combined with the GPS navigation information. This improvement makes the smart phone mostly transparent and will transmit the current real-time image of the instrument panel in any position of the wheel. When the wheel is turned, the camera will transmit the part of the instrument panel currently blocked by the cell phone itself. The software program may be implemented as an app for a smart phone.

Figure 7A:
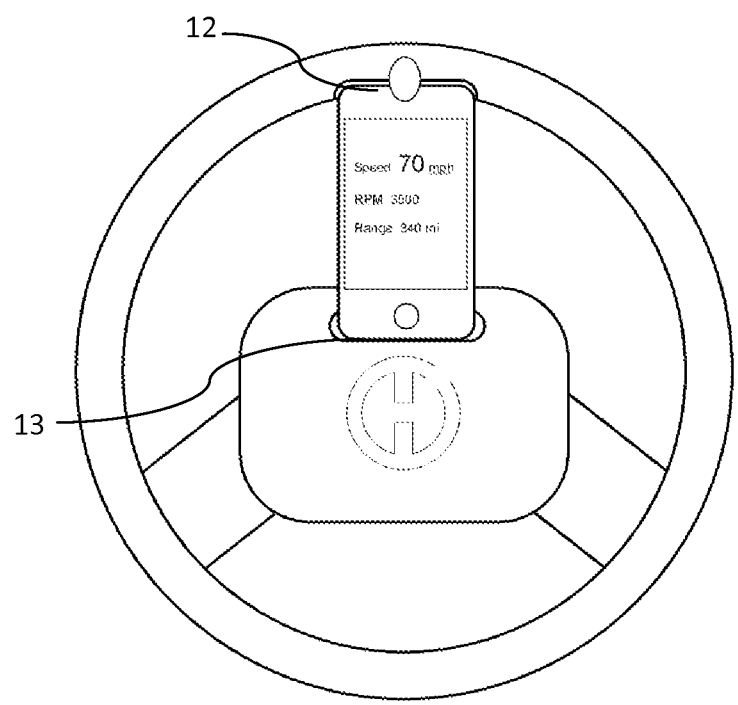
FIGS. 7A and 7B are respectively a front view and a side cross sectional view of yet another embodiment of the invention in which the holder is integrated with the steering wheel.
Figure 7B:
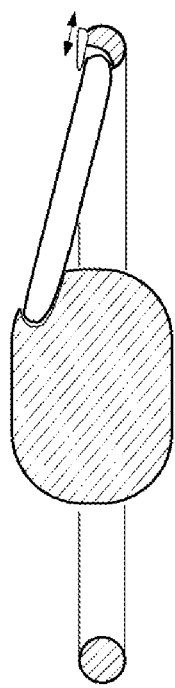

A further improvement of the invention is a permanent mount for an iPhone or another smart phone directly on the steering wheel of a vehicle. Its design is similar to a docking station for an iPhone but it is placed on a steering wheel into a cradle 13 and secured with a detent 12 or another phone retaining feature. Upon getting in the vehicle, the driver may place the smart phone in the holder which will both hold the phone securely within easy reach for GPS or other applications as well as charge the phone while driving—see FIGS. 7A and 7B. Similar adjustment and securing mechanism which is designed into the steering wheel can provide secure mounting of many different types of personal mobile devices and since the steering wheel is designed along with the holder, airbag interference can be addressed by the automotive designers.

Figure 8:
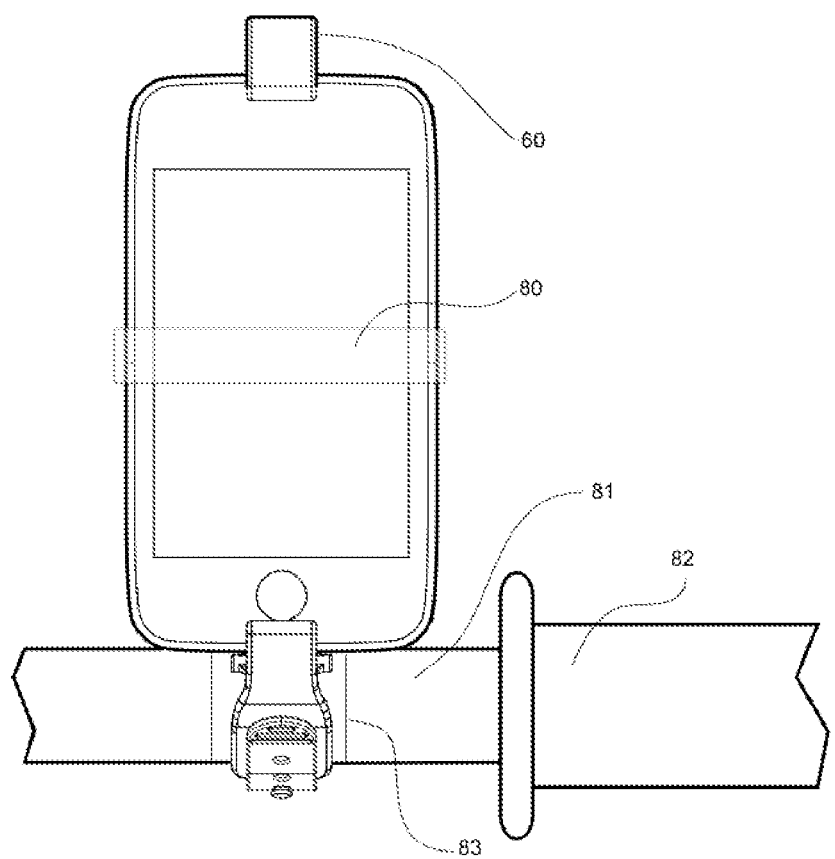
FIG. 8 is a front view of the holder of the invention along with an elastic loop on a bicycle handle.

Another improvement of the invention for very active sports such as mountain biking and motor-cross where excessive vibrations and shocks will be encountered is shown in FIG. 8. For this application, the invention is mounted in an inverted position where lower clamp portion 60 is pointed up for better visibility to the rider and the holder is mounted on the handle 81 near the grip 82. A silicone tape 83 may be provided over the handle 81 to increase the friction under the elastic band 40. Furthermore, a clear elastic loop 80 can be placed around the holder of the invention and the smart phone to eliminate the possibility of lateral movements such as the smart phone slipping sideways out of the holder.

Figures 9A, 9B:
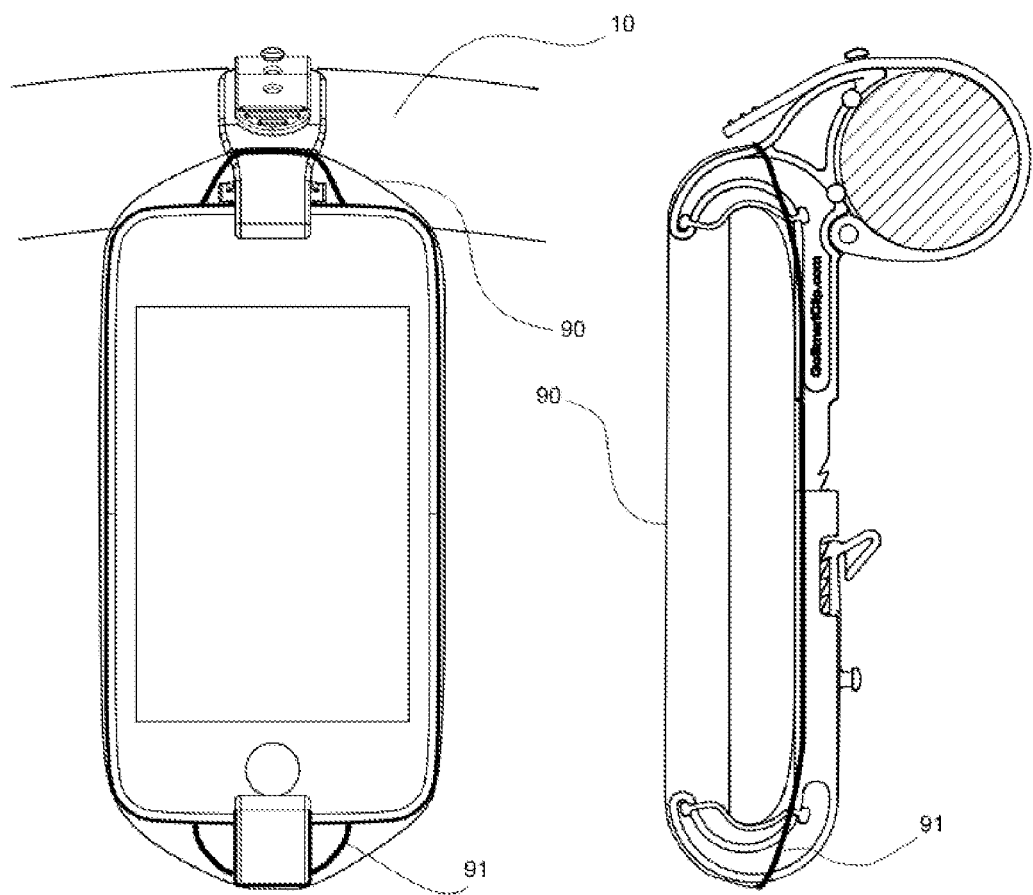
FIGS. 9A and 9B are respectively a front view and a side cross sectional view of water sports embodiment of the invention.

Yet another improvement of the invention for use on a watercraft is shown in FIGS. 9A and 9B. An expandable clear elastic booty is provided such that it can cover the smart phone and the holder of the invention to shield it against water spray. The elastic booty is made with a clear elastic material such as silicone or polyurethane and comprises a front portion 90, and a stretchable holding band 91 which wraps around the smart phone to secure the elastic booty thereon.

The herein described subject matter sometimes illustrates different components or elements contained within, or connected with, different other components or elements. It is to be understood that such depicted architectures are merely examples and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Although the invention herein has been described with respect to particular embodiments, it is understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A removable holder for a smart phone to be supported on a steering wheel having a central area equipped with an airbag, the holder comprising:

a smart phone retainer sized to position said smart phone inside said steering wheel while partially overlapping said central area of the steering wheel containing the air bag, and a steering wheel attachment extending from one end of the smart phone retainer, the steering wheel attachment including a length-adjustable elastic band configured to be wrapped around the steering wheel, said elastic band is characterized by elasticity and frictional properties selected to provide a rotational holding torque of said holder about the steering wheel of at least 0.4 Nm, whereby any rotational torque exceeding 0.4 Nm will cause rotation of said smart phone retainer about said steering wheel; said steering wheel attachment including a pair of parallel raised bars spaced apart along a cross-sectional curvature of the steering wheel, said raised bars extending beyond the width of said elastic band and together with said elastic band forming a 3-point contact of said steering wheel attachment with the steering wheel, wherein said smart phone when inside said holder is supported on said steering wheel on said one end of said smart phone retainer and on said central area on another end of said smart phone retainer with sufficient force to remain steady during rotation of said steering wheel; said removable holder is configured to rotate and retain said smart phone about said steering wheel while moving said smart phone away from said airbag upon deployment thereof.

2. The removable holder as in claim 1, where the smart phone retainer is formed by an upper clamp portion, a lower clamp portion and a length-adjustable mechanism therebetween.

3. The removable holder as in claim 2, wherein said upper clamp portion includes an upper J-hook, said lower clamp portion includes a lower J-hook, said upper J-hook and said lower J-hook are configured to securely retain said smart phone therebetween.

4. The removable holder as in claim 3, wherein at least one of said upper J-hook or said lower J-hook includes an elastic bumper.

5. The removable holder as in claim 3, wherein said J-hook is characterized by having an internal width of an inside portion of said J-hook being about 20 mm, whereby said holder is configured to accept said smart phone with a protective skin covering thereof.

6. The removable holder as in claim 1, further including a length-adjustable mechanism between said upper clamp portion and said lower clamp portion, said length-adjustable mechanism is a releasable ratchet mechanism.

7. The removable holder as in claim 1, where said length-adjustable elastic band included a plurality of spaced apart holes configured to provide secure attachment of the holder to steering wheels having different cross-sectional diameters, said steering wheel attachment having a protruding pin configured to accept one hole of said plurality of holes in said elastic band.

8. The removable holder as in claim 1 further including a detachable adaptor with a 3-point clamp configured to attach said holder to a rear-view mirror.

9. The removable holder as in claim 1 further including a clear elastic loop sized to laterally hold said smart phone to prevent it from sliding sideways in said holder.

10. The removable holder as in claim 1 further including a clear elastic booty sized to cover and insulate said smart phone from the environment while in said holder.

* * * * *